United States Patent Office 3,049,581
Patented Aug. 14, 1962

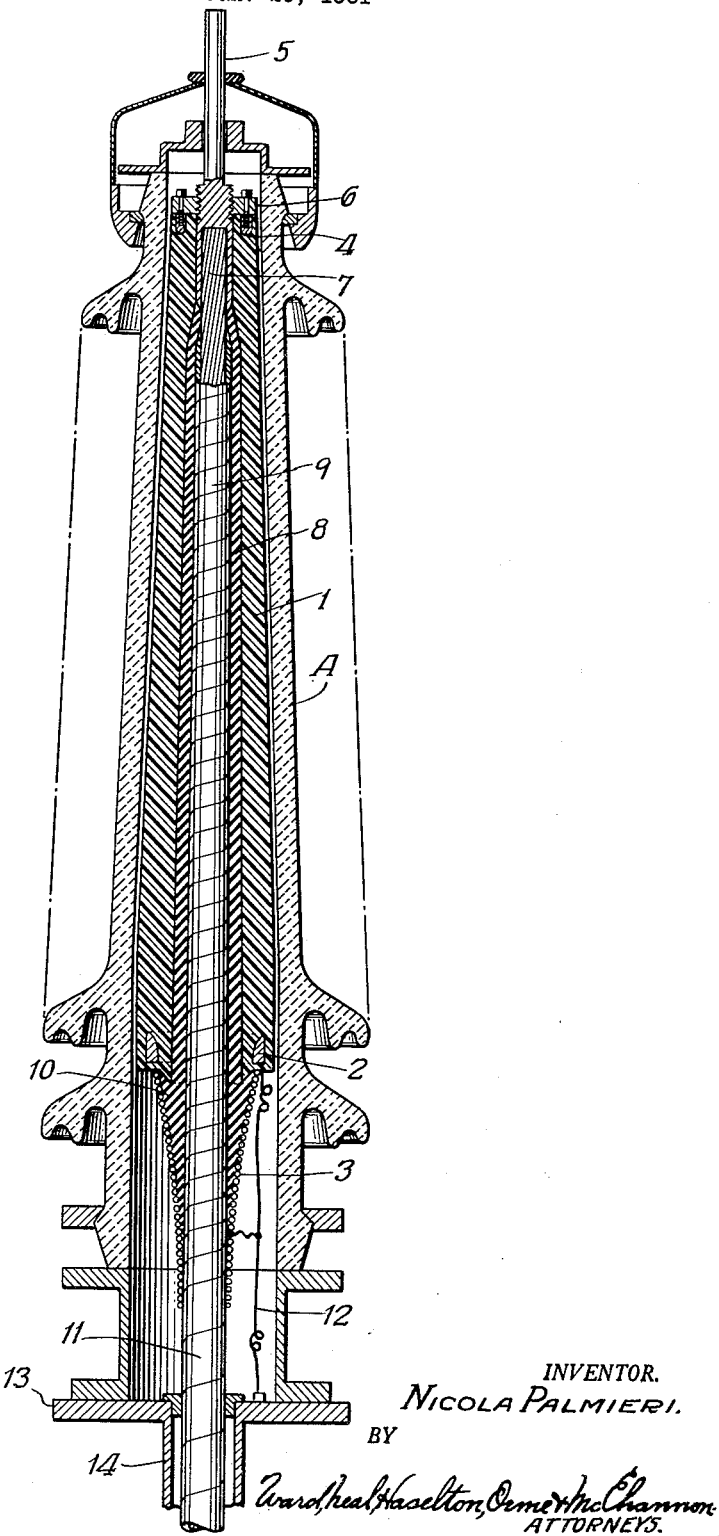

3,049,581
SEALING ENDS FOR HIGH TENSION ELECTRIC CABLES
Nicola Palmieri, Milan, Italy, assignor to Pirelli Societa per Azioni, Milan, Italy, a corporation of Italy
Filed Jan. 25, 1961, Ser. No. 84,931
Claims priority, application Italy Feb. 5, 1960
5 Claims. (Cl. 174—73)

The present invention relates to improvements in the construction of the sealing ends for high-tension electric cables and particularly for the cables of the so-called "pipe" type, namely those in which the cores of the screened cable, devoid of a continuous metal sheath on the insulation, are drawn into a previously installed iron piping.

As it is known, these cables belong to the type having the dielectric immersed in an impregnating fluid, comprising, for example, oil or gas under pressure.

The sealing ends of the above described cables are generally manufactured according to the process and employing the materials hereinbefore indicated.

First of all a slightly conical sleeve-shaped thickening of the end portion of the cable core is carried out by means of tapes of dielectric material or impregnated paper tubes. The larger end of said thickening is normally tapered in a trumpet-like fashion by means of an appropriate disposition of the tapes or by a hand-shaping operation, which consists in cutting the paper tubes with a knife in the concerned portion. The so obtained insulating conical portion is screened with a taper of metal fabric or with a wire wound up in closed coils.

In the present specification this screen will be briefly called "stress-control cone" and the support of insulating tape will be indicated as an "insulating conical support for the stress-control cone." A metallic ring of suitable size insulated with tapes of impregnated paper or with another material having a high dielectric strength is usually provided over the larger end of the stress-control cone. The ring and the stress-control cone must be electrically connected to each other for instance through the metallic base of the sealing end, or through a direct flexible connection.

In the above cited constructions, as the cable is devoid of the metal sheath, the said ring is held in position by means of rigid supports fastened to the base plate of the insulator of the sealing end. The stress-control cone is instead directly supported by the cable core. It follows that these elements, namely the stress-control cone and the metal ring, although they represent in their whole a single electrode, are mechanically connected to two different parts.

This can represent an inconvenience during the normal performance of the cable, in particular when it is overloaded. In fact, on account of the different nature of the parts to which the ring and the stress-control cone are respectively fastened, said parts are subjected, during the cable service, to relative movements originated by the different values of the coefficient of thermal expansion of their own supports. It follows that, during the assembling of the sealing end, an interspace must be provided between the larger end of the stress-control cone and the insulated metal ring in order to allow said movements.

This interspace, although it is filled with the impregnating fluid of the cable, represents a zone of reduced dielectric strength in a dangerous position, as it is highly stressed by the electric field.

In particular, in case of abnormal, but not impossible, thermal expansions originated for instance by an overload on the cable, local alterations of the electric field in the zone between the said elements may take place, sometimes originating electric discharges inside the insulator of the sealing end. The present invention aims first of all at providing a sealing end devoid of the cited inconveniences and then a sealing end whose assembling is greatly facilitated with respect to the assembling of the conventional sealing ends of the already known type.

The principal feature of the sealing end according to the present invention lies in the fact that it comprises a prefabricated element or sleeve of insulating material, intended to be forced on the end portion of the cable previously deprived of the screening and retained, through stud bolts, by a metal ring nut fast with the cable shoe, the end of said insulating element, opposite to that secured to the ring nut, being firmly in contact with the stress control cone and being provided with an incorporated metal ring acting as an ending portion of the stress-control cone itself.

Further characteristics and advantages of the invention will clearly appear from the following detailed description made with reference to the attached drawing, given by way of non-limiting example and representing in longitudinal section the sealing end according to the invention and its corresponding insulator.

The sealing end comprises a prefabricated, unitary, insulating element or sleeve 1 obtained with thermosetting synthetic resins preferably of the ethoxylinic type, in some cases loaded with inorganic excipients. Also, the outer surface of the element 1 has a slight conical shape in order to conform with the inner surface of the porcelain insulator indicated by the letter A which is secured in any conventional manner to the flange 13 at the end of the pipe 14. The lower end of the insulating element 1, with reference to the position on the insulator as represented in the figure, incorporates a metal ring 2 which acts as a stress-control means for the electric field and constitutes the ending portion of a stress-control cone 3.

The end of the element 1, opposite to that incorporating the ring 2, is provided with stud bolts 4 embedded in the body of the said element and designed to support the same. At the upper end of the element 1 there is provided the cable shoe 5 carrying a ring nut 6 to which the sleeve 1 is fastened by means of said stud bolts 4. The cable shoe 5 penetrates for a suitable length into the central hole of the sleeve 1 and engages the end 7 of the cable conductor, which has been previously bared.

The sealing end according to the invention is assembled as follows: first of all a taping 8 is made up on the insulation 9 by using tapes of impregnated crepe paper, said taping being given, by a suitable disposition of the tape, a slight conical shape, whose outer diameter increases downwardly. The prefabricated sleeve 1 is then inserted onto said taping by forcing it downwardly so that it may perfectly adhere to the taping of crepe paper.

An insulating conical sleeve 10, designed to support the stress-control cone 3, is subsequently carried out with tapes of crepe paper. The stress-control cone 3 is obtained with any of the known means, for instance with a winding of tape of copper braid, or with a wire wound up in closed coils, and extends downwardly as far as, and over, the metallic screen 11 of the cable, with which it is electrically connected.

A wire 12 provides the electrical connection of the stress-control cone with the ring 2 and with the metallic flange 13 of the sealing end.

By means of the above indicated disposition, it is evident that any relative displacement between the stress-control cone 3 and the ring 2, due to the different thermal expansion of the parts to which they are fastened, is avoided. In fact these elements, according to the invention, are both fastened to the cable core and consequently it is no more necessary that, during the assembling, an interspace be left between the upper end of the stress-control cone 3 and the metal ring 2; this permits a considerable improvement in the distribution of the electric field at a particularly stressed point (namely the point of contact between said elements).

Moreover, the disposition according to the present invention makes it possible to considerably improve the performance of the sealing end, in that it is constituted by a prefabricated element (sleeve 1) subject to careful inspection.

Finally, further advantages are that the time required for the assembling of the sealing end according to the present invention is remarkably shortened, the use of tubes of impregnated paper to build up the sleeve 1 is completely eliminated and the winding of tapes made of crepe paper is by far reduced with respect to the assembling of the known sealing ends.

It is understood that, the principle of the invention remaining unvaried, the constructional details and the forms of realization can be widely varied with respect to what is described and illustrated by way of non-limiting example, without however falling out of the scope of the invention itself.

What I claim is:

1. A sealing end for the end of a high tension electric cable mounted on a fixed support, said cable comprising a conductor surrounded by insulation which in turn is surrounded by a conductive layer, said sealing end comprising a conductive stress control cone surrounding a portion of said insulation spaced from the end of said cable conductor and engaging a portion of said conductive layer, said stress control cone being spaced from said end of said cable conductor, a unitary insulating sleeve inserted as a unit over the portion of said insulation intermediate said cone and said end of said conductor, said sleeve surrounding said last-mentioned portion of said insulation and engaging said stress control cone at one end and, at the opposite end, being adjacent said end of said conductor, a conductive element embedded in said sleeve and extending around said cable insulation, said element being adjacent said stress control cone, means conductively interconnecting said cone and said element, and means mechanically interconnecting said end of the cable conductor and the portion of said sleeve adjacent thereto and said sleeve being otherwise free of rigid connection with said support whereby said sleeve is free to move with respect to said support.

2. A sealing end as set forth in claim 1 in which said sleeve is rigid and said means mechanically interconnecting said conductor end and said sleeve provides a rigid interconnection therebetween.

3. A sealing end as set forth in claim 2 in which said means mechanically interconnecting said conductor end and said sleeve comprises a metal shoe secured to said conductor end and having an outwardly extending flange, and means securing said flange to the end of said sleeve.

4. A sealing end for the end of a high-tension electric cable disposed in a pipe and slidable with respect thereto, said cable comprising a conductor surrounded by insulation which in turn is surrounded by a conductive layer and said cable having an end portion thereof extending out of said pipe, said conductive layer terminating at a point spaced from the end of said conductor and said insulation terminating between the end of said layer and said end of said conductor, said sealing end comprising a conductive stress control cone surrounding a portion of said insulation and engaging a portion of said conductive layer and extending from said layer to a point intermediate said end of said layer and the end of said insulation, a unitary insulating sleeve inserted as a unit over the portion of said insulation intermediate said cone and said end of said conductor, said sleeve surrounding said last-mentioned portion of said insulation and engaging said stress control cone at one end and, at the opposite end, being adjacent said end of said conductor, a conductive element embedded in said sleeve and extending around said cable insulation, said element being adjacent said stress control cone, means conductively interconnecting said cone and said element, and means mechanically interconnecting said end of the cable conductor and the portion of said sleeve adjacent thereto.

5. A sealing end for the end of a high-tension electric cable disposed in a pipe and slidable with respect thereto, said cable comprising a conductor surrounded by insulation which in turn is surrounded by a conductive layer and said cable having an end portion thereof extending out of said pipe, said conductive layer terminating at a point spaced from the end of said conductor and said insulation terminating between the end of said layer and said end of said conductor, said sealing end comprising a layer of insulation surrounding the portion of said insulation of said cable between said end of said conductive layer and said end of said conductor, a conductive stress control cone surrounding and engaging a portion of said further layer of insulation and extending from said end of said conductive layer to a point intermediate said end of said conductive layer and the end of said layer of insulation, a unitary insulating sleeve inserted as a unit over the portion of said layer of insulation intermediate said stress control cone and said end of said conductor, said sleeve surrounding said last-mentioned portion of said layer of insulation and engaging said stress control cone at one end and, at the opposite end, being adjacent said end of said conductor, a conductive element embedded in said sleeve and extending around said layer of insulation, said element being adjacent said stress control cone, means conductively interconnecting said stress control cone and said element, means mechanically interconnecting said end of the cable conductor and the portion of said sleeve adjacent thereto, and a hollow insulator surrounding said stress control cone and said sleeve, said insulator being secured to the end of said pipe, and said element, said stress control cone and said sleeve being free to move with said cable.

References Cited in the file of this patent
UNITED STATES PATENTS 2,651,670    Bosworth _____ Sept. 8, 1953

FOREIGN PATENTS 167,186    Australia _____ Mar. 7, 1956